United States Patent
Itay et al.

(10) Patent No.: US 8,186,602 B2
(45) Date of Patent: May 29, 2012

(54) MULTI-APPLICATION CONTACTLESS SMART CARD

(75) Inventors: Nehemya Itay, Beit Hillel (IL); Aharon Binur, Kibbutz Ma'ayan Baruch (IL); Oded Bashan, Rosh Pina (IL)

(73) Assignee: On Track Innovations, Ltd., Rosh Pina (IL)

( * ) Notice: Subject to any disclaimer, the term of this patent is extended or adjusted under 35 U.S.C. 154(b) by 323 days.

(21) Appl. No.: 12/543,007

(22) Filed: Aug. 18, 2009

(65) Prior Publication Data
US 2011/0042464 A1    Feb. 24, 2011

(51) Int. Cl.
*G06K 19/06* (2006.01)
(52) U.S. Cl. .......................................... 235/492
(58) Field of Classification Search ............... 235/379, 235/492
See application file for complete search history.

(56) References Cited

U.S. PATENT DOCUMENTS

| | | | |
|---|---|---|---|
| 6,024,286 A | 2/2000 | Bradley et al. | |
| 7,191,952 B2 | 3/2007 | Blossom | |
| 7,232,073 B1 | 6/2007 | De Jong | |
| 2004/0124246 A1 | 7/2004 | Allen et al. | |
| 2005/0121513 A1* | 6/2005 | Drummond et al. | 235/381 |

FOREIGN PATENT DOCUMENTS
EP    1 939 822    7/2008

OTHER PUBLICATIONS

Baentsch M et al: "Javacard—from Hype to Reality" IEEE Concurrency, IEEE Service Center, Piscataway, NY, US LNKD-DOI: 10.1109/4434.806977, vol. 7, No. 4, Oct. 1, 1999, pp. 36-43 XP000873322 ISSN: 1092-3063.
Search Report of EP Application No. 10 17 3327 dated Nov. 12, 2010.

* cited by examiner

*Primary Examiner* — Daniel Hess
(74) *Attorney, Agent, or Firm* — Pearl Cohen Zedek Latzer, LLP

(57) ABSTRACT

A multi-application contactless smart card system and method. The user may select application using selection mechanism located on the smart card or at the contactless reader. The selection means may be connected to the contact I/O pin of the processor of the smart card. In some embodiments, the processor of the smart card may read the user selection through the contact I/O pin during a simulated contact transaction, evoke the desired application and perform the contactless transaction. During the simulated contact transaction power up sequence is preserved by extracting power signals to the contact VDD pin from the RF signal. Alternatively, the state of the selection mechanism may be sampled continuously or at convenient time intervals, enabling further switching between applications during a single contactless session.

11 Claims, 8 Drawing Sheets

MULTI-APPLICATION CONTACTLESS SMART CARD

FIELD OF THE INVENTION

The present invention relates to the field of contactless smart cards. More specifically, the invention relates to a mechanism for operating multiple applications in a contactless smart card.

BACKGROUND OF THE INVENTION

Smart cards, also known as chip cards or integrated circuit cards, are typically pocket-sized cards with embedded integrated circuits, capable of communicating with a reader and processing communicated data. Common applications for smart cards include, for example, their use as electronic wallets, credit or ATM cards, fuel cards, high-security identification and access-control cards, public transport and public phone payment cards, identification cards, drivers' licenses, patient cards, and so on.

Commonly used smart cards may have a contact interface, or a contactless interface, or both. Contact smart cards have a contact area, comprising several metallic contact pads, typically totaling approximately one square centimeter on the face of the card. When inserted into a card reader, the contact plate of the smart card aligns with the electronic contacts inside the reader, and data is transmitted over the electrical connection. One standard for contact smart card is ISO/WEC 7816, the contents of which are incorporated herein by reference.

As their name suggests, contactless smart cards may transfer data between the card and the card reader without requiring electrical contact. A contactless transaction may occur when the cardholder presents the contactless smart card within a required proximity from the card reader. The data may be conveyed across this distance via radio frequency (RF) electromagnetic field signals. One standard for contactless smart card communications is ISO/WEC 14443, the contents of which are incorporated herein by reference, which defines two types of contactless cards, "A" and "B", and allows for communications at distances up to 10 cm. An alternative standard for contactless smart cards is ISO 15693, the contents of which are incorporated herein by reference, which allows communications at distances up to 50 cm. It will be recognized that despite the name smart card, because contactless environments eliminate the need to physically insert the card into a reader, contactless smart cards need not to be in card form, but may take the form of a key fob, a wristwatch, a bracelet, a sticker, a ring, etc.

Some smart cards can support both contact and contactless modes, and are referred to as dual mode or contact/contactless smart cards. In such dual mode cards, the communication protocol may be different for the contact and the contactless modes of operation. A dual mode card may typically determine whether the card is used in contact or contactless mode by sensing the source of the power supply to the chip. Contact mode may be enacted if the operating voltage is supplied via C1 (VCC pad of the contact pads) and contactless mode may be enacted if operating voltage is supplied via the RF field, typically when an operating voltage is not sensed via C1. "Mixed" mode is a special combination mode that may be further supported by some dual mode smart cards. Mixed mode may define simultaneous operation in both contact and contactless modes. In such case, the smart card may simultaneously be accessed by contact and contactless readers. Hence, power, bidirectional data communication, reset and clock signals, are available from both sources. In such cases, the card is typically required to handle communication with both readers, while selecting (typically under software control) which operating voltage, reset and clock signals to use (contact or contactless).

Generally, smart cards support one application, e.g., a particular credit card. However, modern consumers may have many such applications, e.g., a plurality of cash and credit cards, fuel cards, high-security identification and access-control cards, public transport and public phone payment cards, citizen identification cards, drivers' licenses, patient card, and so on. If each card supports an application, a consumer may be required to carry a large number of smart cards, which may be cumbersome.

SUMMARY OF EMBODIMENTS OF THE INVENTION

Embodiments of the present invention include a contactless multi-application smart card system comprising: a processor having stored thereon a plurality of applications; a selection mechanism to enable a user to select a state among of a plurality of states, each one of said states corresponding to a respective application among said plurality of applications; and circuitry to enable said processor to sample the state of said selection mechanism, said circuitry may sample the state of the selection mechanism if a radio frequency (RF) signal from a contactless reader is present, wherein said processor is to run said selected application based upon the sampled state of the selection mechanism. The selection mechanism may be mounted on the card, or on the contactless reader. The selection mechanism may be a switch having a plurality of states, and the circuitry may produce a respective voltage level for each state of said switch, and to translate said voltage level to a digital signal at an input to said processor, wherein said processor is to determine said respective application among said plurality of applications, based on said respective digital signal at said input. The circuitry may produce a respective combination of digital signals for each state of said switch at multiple inputs to said processor, and the processor may determine said respective application, selected from said plurality of applications, based on said respective combination of digital signals at said multiple inputs. The processor may operate in any of a contact mode, a contactless mode, or a mixed contact-contactless mode, and upon the presence of a radio frequency (RF) signal from a contactless reader, said circuitry may further engage said processor in said mixed contact-contactless mode operation so as to enable said processor to determine based thereupon the state of said switch. The processor may be able to operate in any of a contact mode, a contactless mode, or a mixed contact-contactless mode, wherein the circuitry is to enable operation in mixed contact-contactless mode by extracting contact supply voltage from the RF signal.

Embodiments of the present invention further include a method of operating a contactless multi-application smart card containing a processor having stored thereon a plurality of applications, said method comprising: providing a selection mechanism having a plurality of states, each of said states corresponding to respective application; upon presence of a radio frequency (RF) signal from a contactless reader proximate to said card, determining the state of the selection mechanism by said processor; and initiating by said processor said corresponding application based on said determined state. The method may include providing a switch having a plurality of states and determining the state of the switch, which may include producing a respective voltage level based on the state of said switch; translating said voltage level to a digital signal at an input to said processor; and determining by said processor said respective application, out of said plurality of applications, based on said respective digital signal at said input. The method may further include extracting contact supply voltage from said RF signal; maintaining contact mode power up sequence; and engaging said processor in said mixed contact-contactless mode operation so as to enable said processor to determine thereafter the state of said switch.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
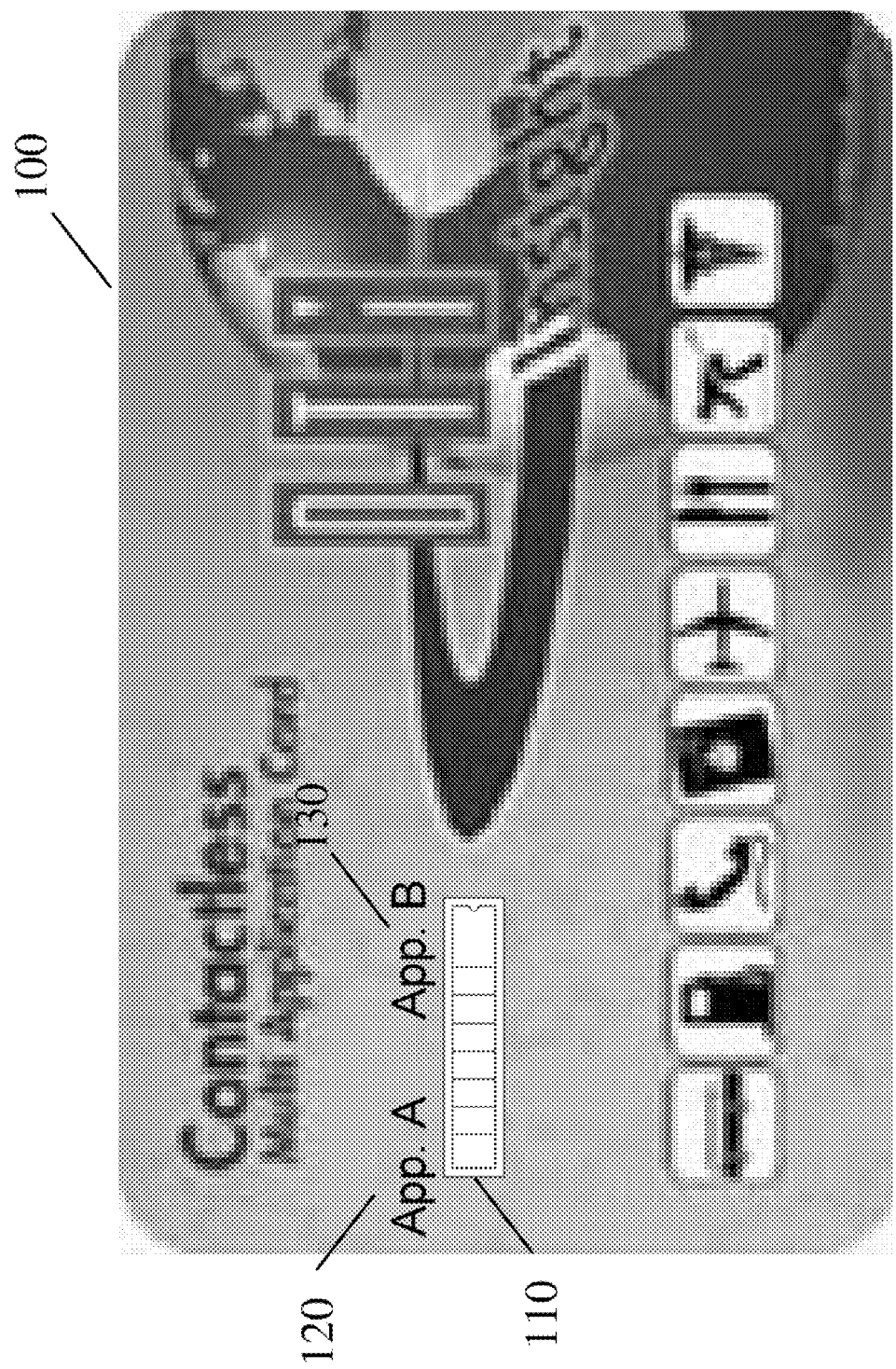
FIG. 1 is an exemplary illustration of a multi-application contactless smart card according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

According to embodiments of the invention, a single smart card may support a plurality of applications, for example, different card types, selected from credit cards, ATM cards, etc. More specifically, according to some embodiments of the invention, the selection mechanism for selecting an application from the plurality of applications available on a smart card may be located on the smart card itself. The user may perform mechanical action to execute the selection. Inside the card this mechanical action may be converted for example to a resistance change, a capacitance change, or an electrical voltage change, which may be sensed by one of the contact pads inputs. For example, some embodiments of the invention may implement the selection mechanism using a switch, contact, relay, variable resistor, variable capacitor or other suitable devices. Alternatively, the selection means may be located at the reader. For example, the reader may prompt a menu for the user to select an application, for instance, by keying it in the reader, buy using a touch-screen and so on. Alternatively or additionally, other selection means may be located at the reader. After the application is selected, the reader may operate according to the selected application and the card responds accordingly.

Reference is now made to FIG. 1 which is an exemplary illustration of a multi-application contactless smart card 100 with a selection mechanism, for example, a mechanical switch 110 according to some embodiments of the invention. It will be recognized that the switch may be implemented in any suitable form. It will be further recognized that while the exemplary embodiment depicts a switch having two states "A" and "B" for reasons of simplicity, the invention is not limited in this respect, and may be used to select any plurality of two or more applications based on the principles disclosed herein.

According to some embodiments of the present invention, the contact I/O pin of a multi-application contactless smart card 100 may be connected to the selection mechanism, for example switch 110, mounted on the smart card 100. The switch 110 may enable the user to choose among a plurality of two or more applications. Each state of the switch 110 may represent one application. Prior to or during presenting the smart card to the contactless reader, the user may set the switch 110 to a setting corresponding to a desired application. In the initialization process, when the smart card starts to communicate with the reader, the smart card 100 may read the state of the switch, and load the suitable application accordingly. After the application is loaded, a contactless transaction may be performed based on the selected application. For example, in the smart card 100 illustrated in FIG. 1, the user may choose, prior to or during presenting the card to the reader, between application A 120 and application B 130 using the switch 110 mounted on the smart card 100.

Figure 2A:
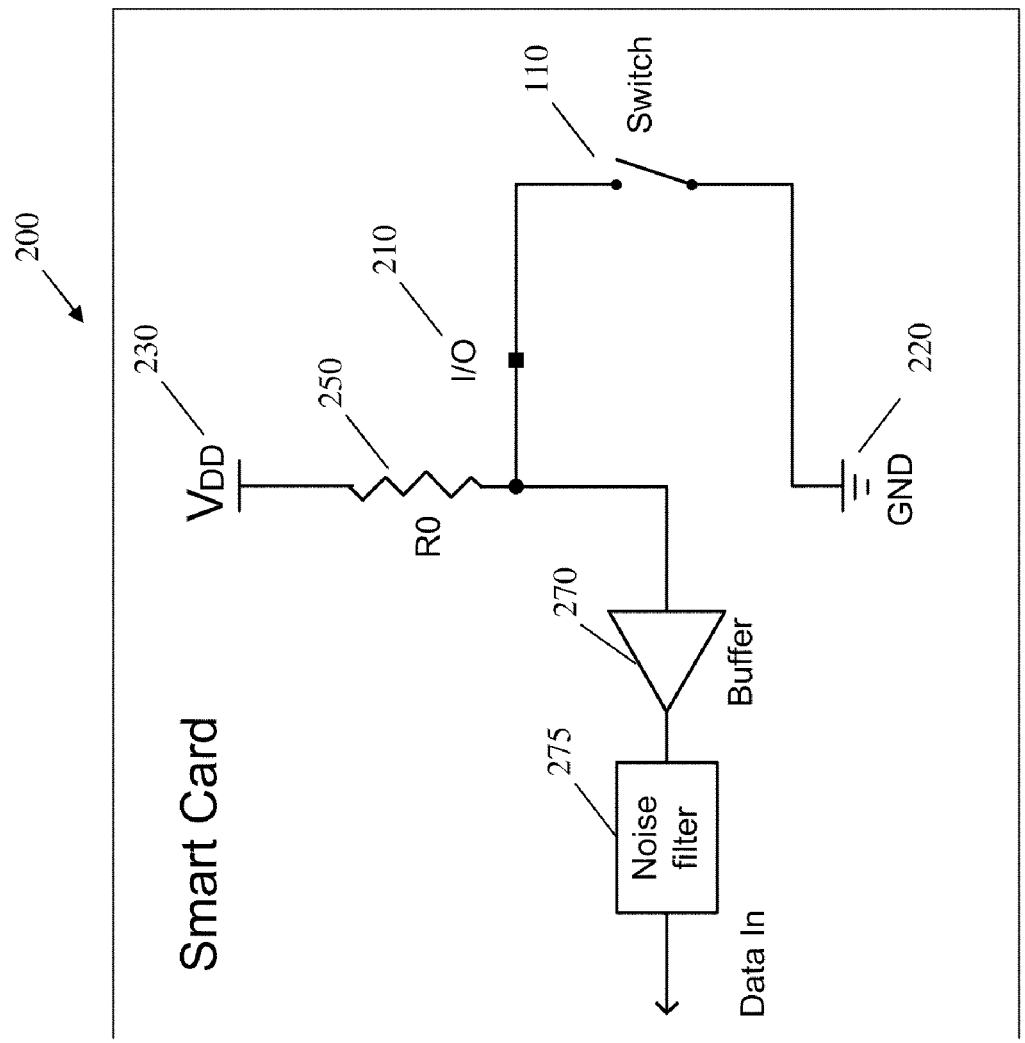
FIG. 2A is an exemplary schematic illustration of the input section of the internal circuit of an I/O pin of the processor chip connected to a switch according to embodiments of the present invention.

Reference is now made to FIG. 2A, which is an exemplary schematic illustration of an implementation of input circuitry of a smart card 200 according to embodiments of the invention, including an input/output (I/O) pin 210 of the smart card connected to an external switch 110 mounted on the smart card, for example, as depicted in FIG. 1. The I/O pin can be part of the set of contact pins, allocated for contact mode of operation, or a special dedicated I/O pin. It will be recognized that the portion of the circuit depicted inside rectangle 200 may be internal to the smart card circuitry and not accessible to the user, while switch 110 may be mounted on the smart card. Switch 110 may be connected to the contact I/O or to other, dedicated I/O pin 210 at one end and to GND pin 220 on the other end.

In operation, when smart card 200 is brought into proximity with a contactless reader, providing a voltage $V_{DD}$, 230, then when switch 110 is in an open position voltage at I/O pin 210 may be electrically pulled to $V_{DD}$, representing a logical '1' or HIGH, and accordingly, the data in is a first logical value. When switch 110 is in a closed position while smart card 200 is brought into proximity with a reader voltage at 110 pin 210 may be electrically pulled to GND, representing a logical '0' or LOW, and accordingly, the data in is a second logical value. The voltage level at I/O pin 210 may be buffered by buffer 270, filtered by noise filter 275 and sampled by the processor (not shown). The logical value of data in may be used to determine the selection of the application. Alternatively or additionally, other selections means, as well as other filtering and sampling techniques may be implemented.

According to some embodiments of the present invention, a processor chip that supports mixed mode operation may be used in a multi-application contactless-only smart card. In particular, in some embodiments of the present invention, the processor may use the contact I/O pin in connection with the application selection switch and input circuitry, as described above, to select at least a first or second application. Depending on the value read from the contact I/O pin, the software application of the smart card may jump to a first or second section of the code corresponding to the first or second application, as selected by the user.

Figure 2B:
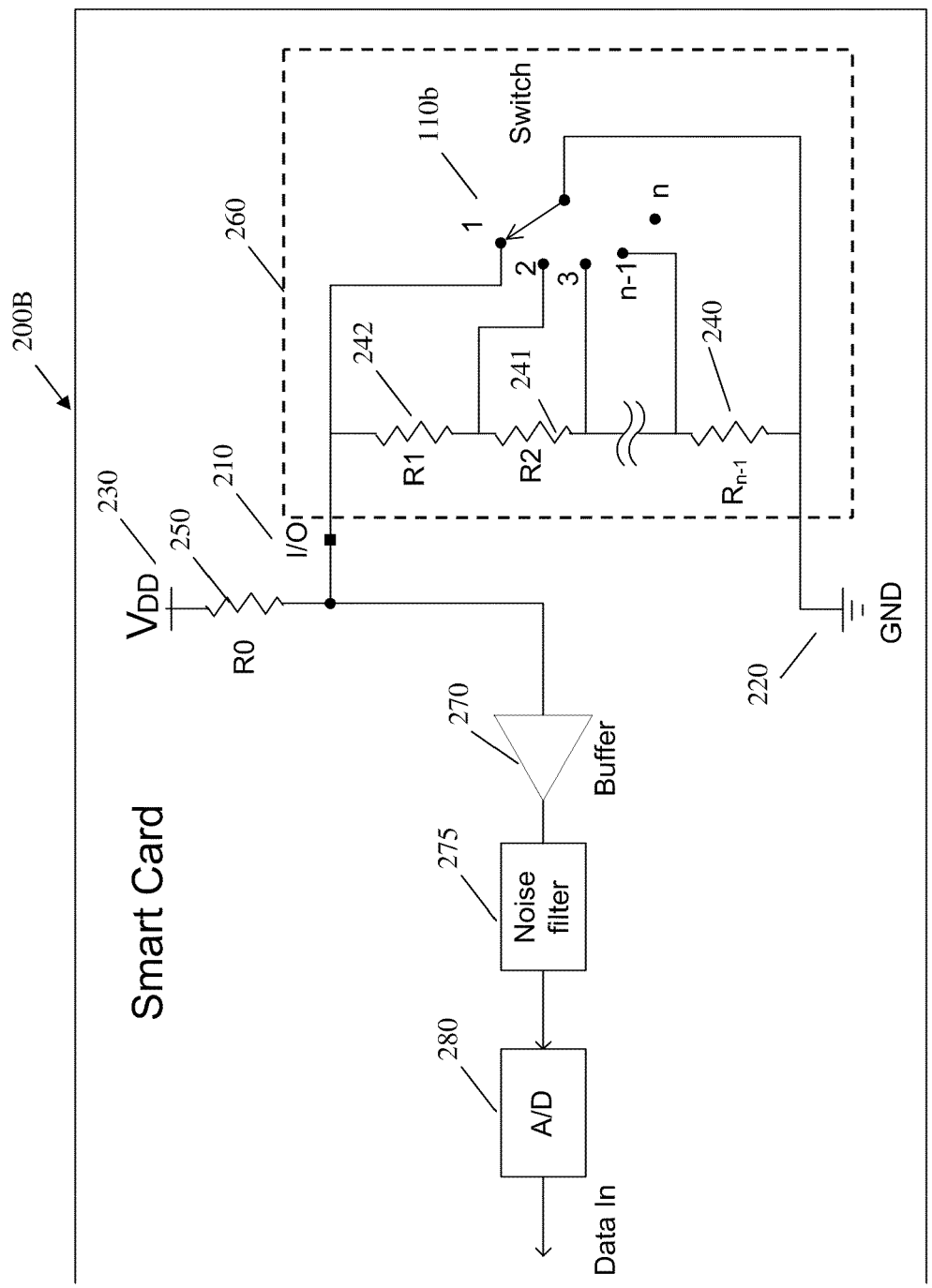
FIG. 2B is an exemplary schematic illustration of the input section of the internal circuit of an I/O pin of the processor chip connected to a switch supporting more than two states according to embodiments of the present invention.

Reference in now made to FIG. 2B which is a schematic illustration of an exemplary selection mechanism enabling selection between more than two applications using a multi-pole switch 110*b*. A series of resistors 240, 241 and 242 may be connected as shown to switch 110*b*, thus the resistance level between I/O pin 210 and GND may change when the position of switch 110*b* changes, forming a variable resistor 260 between I/O pin 210 and GND pin 220. Variable resistor 260 my form a voltage divider together with resistor 250. Buffer 270 may buffer the analogue signal present at I/O pin 210 and the signal may be filtered by a noise filter 275. An Analog to Digital converter (A/D) 280 may convert the analogue signal to different digital values, each representing a state of switch 110*b* and each related to a different application. In an alternative implementation, resistor 250 may be replaced by a current source. When smart card 200*b* is brought into proximity with a contactless reader, providing a voltage to $V_{DD}$, 230, the voltage level at I/O pin 210 is determined by the position of multi-pole switch 110*b*. This voltage level may be buffered by buffer 270, filtered by noise filter 275 and converted to a digital value by A/D 280. The converted digital value may subsequently be available for the smart card to select and run the appropriate application. Alternatively or additionally, other selections means, as well as other filtering and sampling techniques may be implemented.

It should be apparent to one skilled in the art that the processor, the noise filter, the buffer 270, the A/D 280 as well as R0 (or its current source replacement) may be implemented on a single System On a Chip (SOC), or in separate components, as needed. Resistors 240, 241 and 242 may also be implemented on the chip wherein additional I/O pins would be required on the chip to connect to the poles of the switch 110*b*.

Figure 2C:
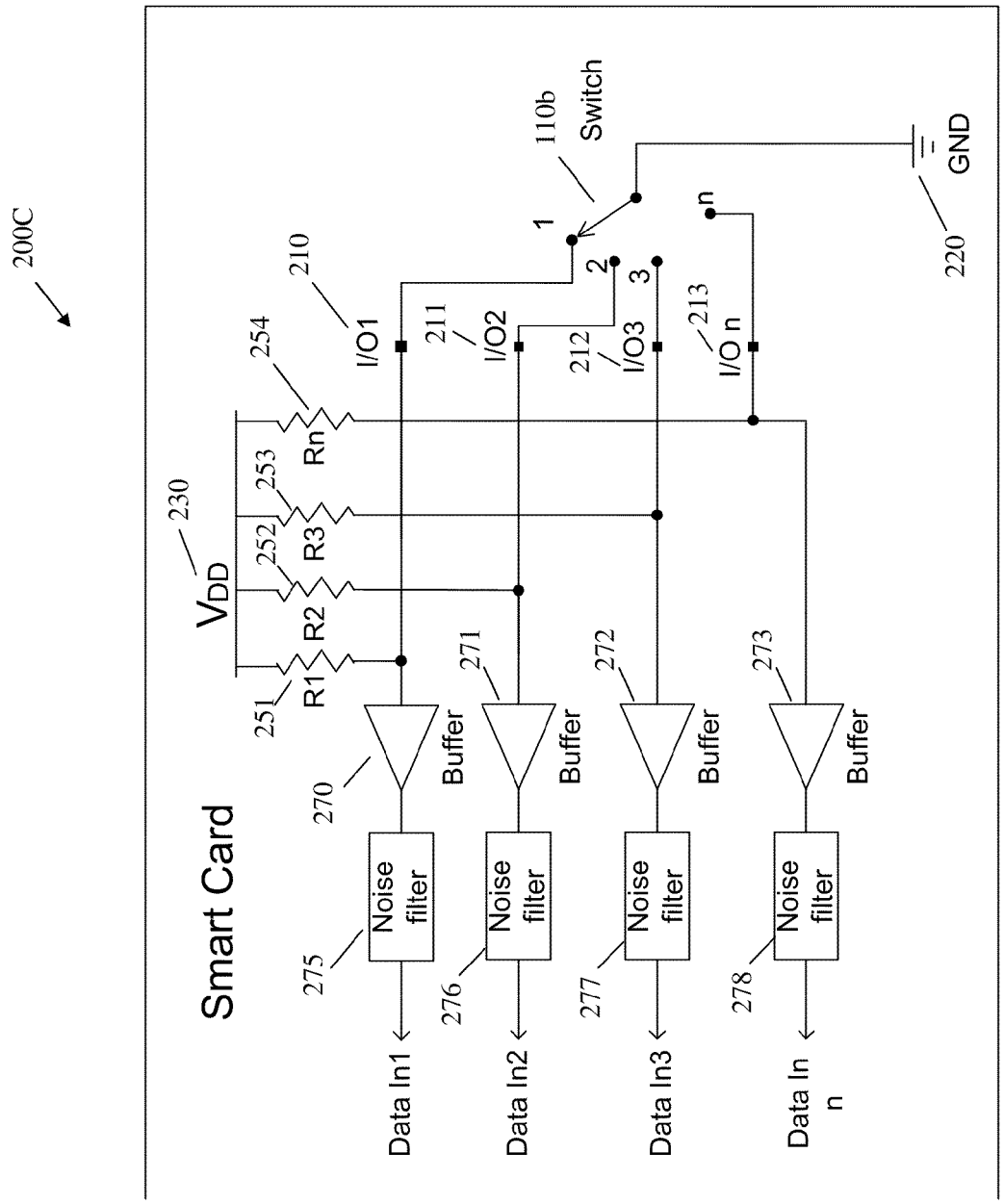
FIG. 2C is an exemplary schematic illustration of the input section of the internal circuit of I/O pins of the processor chip connected to a switch supporting more than two states according to embodiments of the present invention.

Reference in now made to FIG. 2C which is a schematic illustration of another exemplary selection mechanism enabling selection between more than two applications using a multi-pole switch 110*b*. Here more than one I/O pin may be used 210, 211, 212, 213, where for example each pole of switch 110*b* is connected to a separate I/O pin 210, 211, 212, 213 and where each I/O pin 210, 211, 212, 213 is connected to its own pull up resistor 251, 252, 253, 254, similar to R0. Each I/O signal may be then buffered 270, 271, 272, 273 and noise filtered 275, 276, 277, 278 and fed into the microprocessor as described in FIG. 2A for single input configuration. With this alternative a multiple digital data inputs array is formed versus the single data input of FIG. 2A. The microprocessor may then select the appropriate application according to the combined status of the multiple data inputs.

Figure 3:
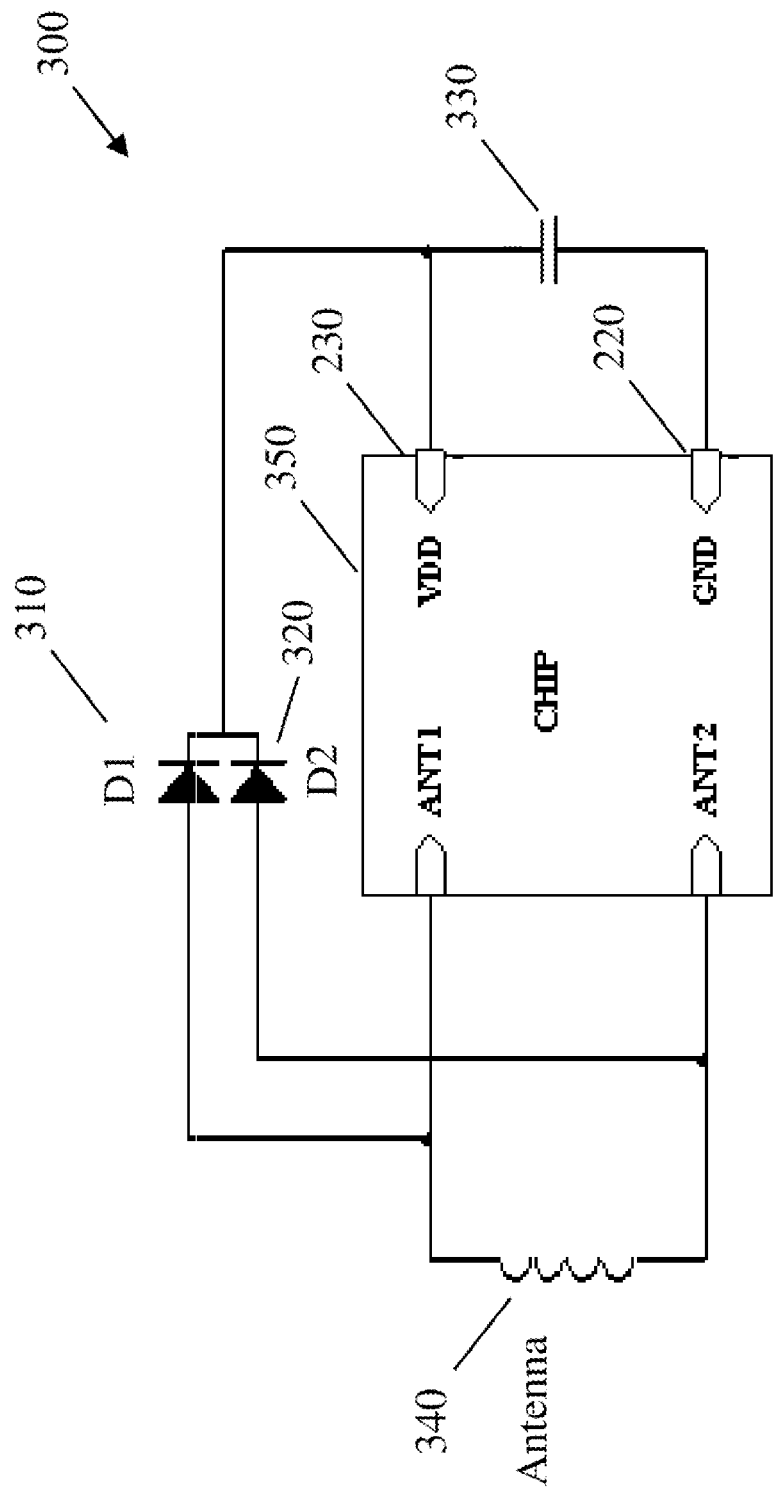
FIG. 3 is a schematic illustration of an electrical circuit that rectify DC power from the RF antenna and supply voltage to the contact C1, VDD pin that may be used in embodiments of the present invention.

Reference in now made to FIG. 3, which is a schematic illustration of an electrical circuit 300 that includes additional circuitry to externally provide supply voltage to VDD pin 230 of the chip in order to trigger mixed mode operation and optionally for use in connection with the input circuitry of FIGS. 2A and 2B, above. Generally, the additional circuitry is used to rectify power received from the reader using RF antenna 340, and supplying the rectified voltage to the contact VDD pin 230 of processor chip 350. Two diodes 310, 320 may be connected between each of antenna 340 terminals and VDD pin 230 to form a positive half of a RF voltage rectifying bridge, operating in conjunction with a negative half of a RF voltage bridge that may already be provided internally to chip 350 as part of the internal rectification bridge. A RF filtering capacitor 330 may be connected between VDD pin 230 and GND pin 220 of processor chip 350.

According to some embodiments of the present invention, a smart card supporting mixed mode may be "fooled" by the additional circuitry into perceiving a contact voltage supply as described with reference to FIG. 3, and hence enter into mixed mode operation, where in reality the smart card is merely in the presence of a contactless reader, and thereby the processor may read the status of the switch connected to the contact I/O pin.

Figure 4:
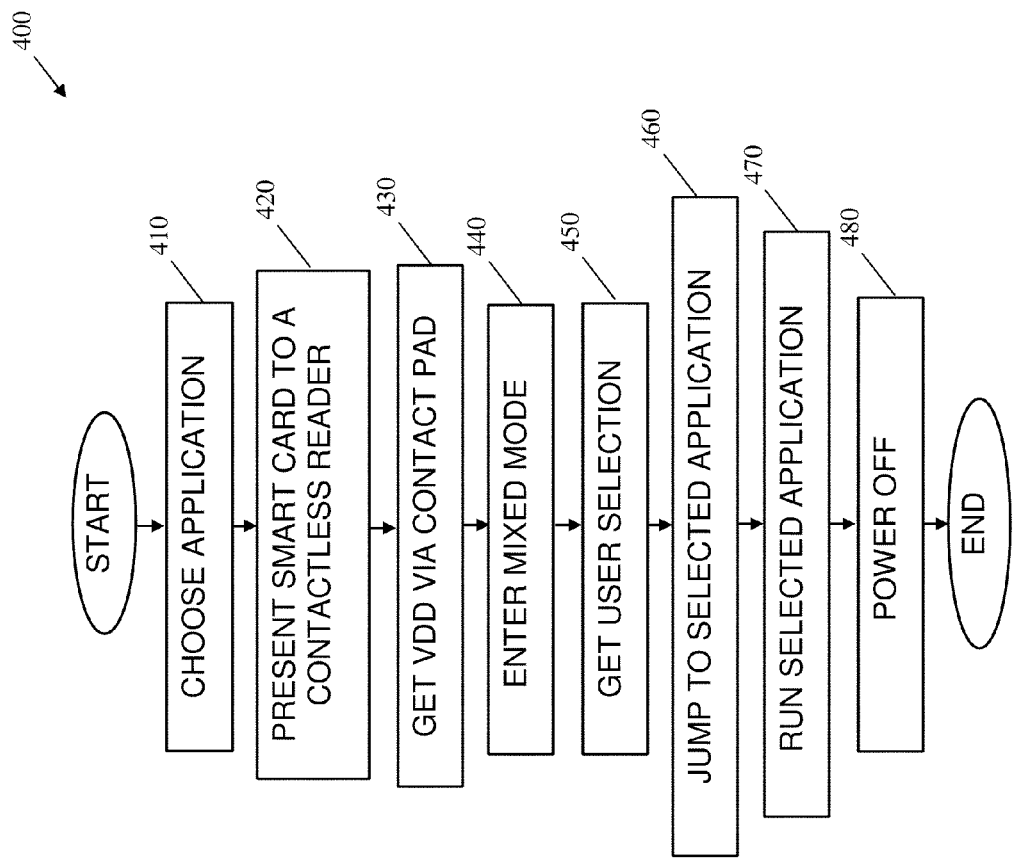
FIG. 4 is an exemplary schematic flowchart illustration of a method according to embodiments of the present invention demonstrating the process of selecting an application and performing a contactless transaction.

Reference is made to FIG. 4, which is an exemplary schematic flowchart illustration of a method 400 which demonstrates the process of selecting an application and performing a contactless transaction according to some demonstrative embodiments of the invention. According to some demonstrative embodiments of the invention, a user that wishes to perform a contactless transaction with an exemplary multi-application smart card of the current invention may select the desired application using a selection mechanism associated with the smart card 410. In order to perform the transaction the user may present the contactless smart card into close proximity with the contactless reader 420, for example, as defined in ISO/IEC 14443. Upon receiving signals at the antenna, and as explained in regard to FIG. 3, a power up sequence will be evoked and the smart card will be "fooled" to wake-up in mixed contact-contactless mode 440 as it gets voltage at the contact $V_{DD}$ pin 430 and as the chip is configured to mixed mode operation. After the power up sequence the user selection may be read 450. For example, if the selection mechanism implemented is a switch mounted on the smart card, the level of the contact I/O pin, determined by the switch condition, may be read. The respective application may then be selected 460, and while the application is running, a contactless transaction according to the selected application may take place 470. Upon completion of the transaction, the card may be removed from the reader and go to Power Off state 480.

Figure 5:
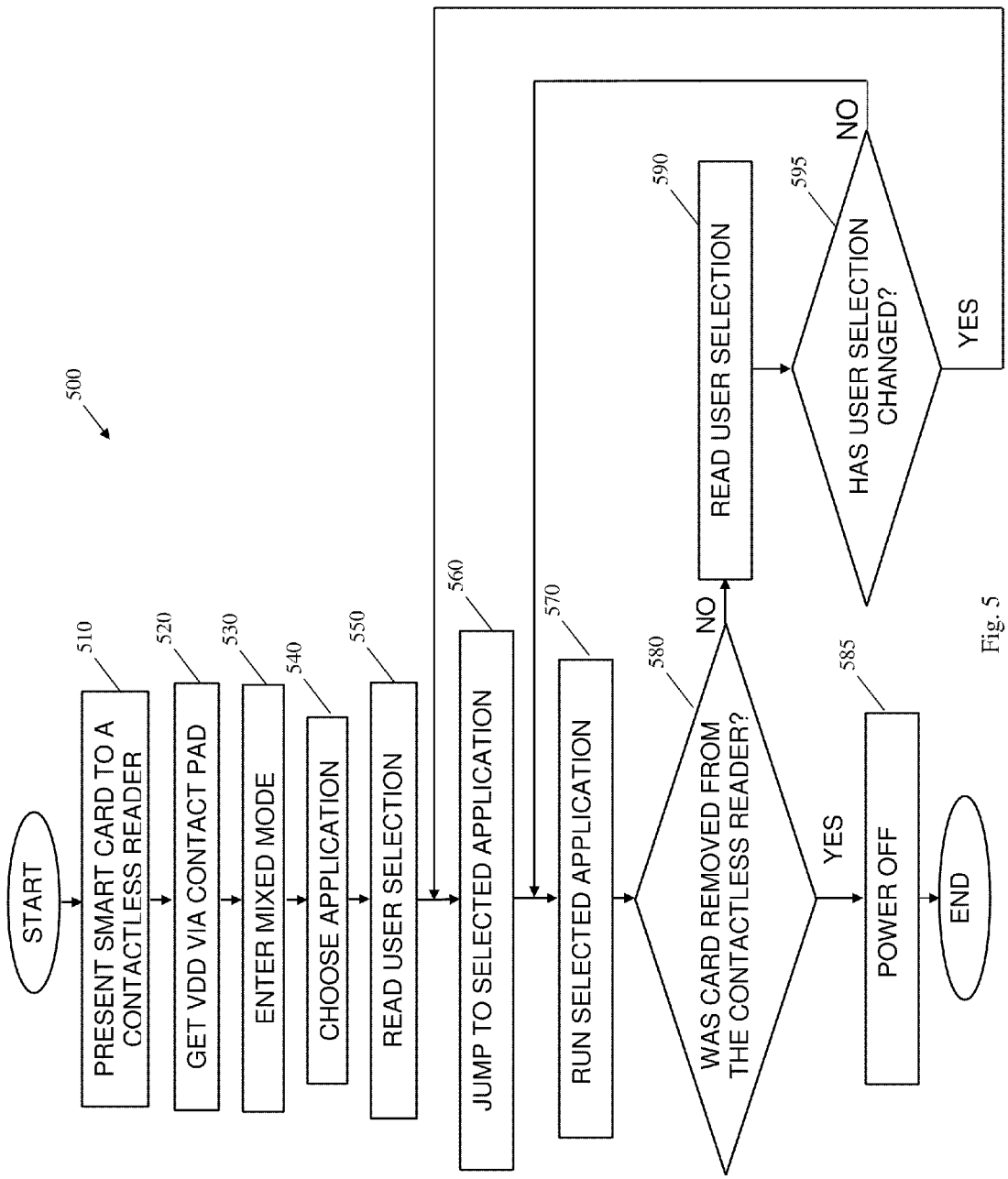
FIG. 5 is an exemplary schematic flowchart illustration of a method according to embodiments of the present invention demonstrating the process of performing multiple contactless transactions of different applications during a single contactless session using the mixed mode operation.

Reference is made to FIG. 5, which is an exemplary schematic flowchart illustration of a method 500 which demonstrates the process of performing multiple contactless transactions of different applications during a single contactless session using the mixed mode operation according to embodiments of the invention. According to some demonstrative embodiments of the invention, the user may present the contactless smart card into close proximity with the contactless reader 510, for example, as defined in ISO/WEC 14443. Upon receiving signals at the antenna, and as explained in regard to FIG. 3, a power up sequence may be evoked and the smart card may be "fooled" to wake-up in mixed contact-contactless mode 530 as it gets voltage at the contact $V_{DD}$ pin 520 and as the chip is configured to mixed mode operation. After the power up sequence the user present selection may be read 550. The user may then select an application using a selection mechanism associated with the smart card 540, the user selection may be read 550, the respective application may be selected 560, and while the application is running, a contactless transaction according to the selected application may take place 570. While executing the selected application, and as long as the card is kept in proximity with the contactless reader 580, the user selection may be monitored continuously or at convenient time intervals 590. In case the user changes his selection 595, the respective new application may be selected 560, and a contactless transaction according to the new selected application may take place 570. Upon completion of the session, the card may be removed from the reader and go to Power Off state 585.

Alternatively, a contact I/O pin, or a plurality of pins, dedicated to sampling the switch condition, may be active during contactless transactions eliminating the need to use the mixed "contact-contactless" mode. Accordingly, the level of the contact I/O pin or pins, determined by the switch condition, may be sampled continuously or at convenient time intervals, enabling further switching between applications, following changes of the switch conditions, during a single contactless session. Similarly, according to embodiments in which the selection means are located at the reader, the user selection may be sampled at convenient time intervals allowing switching between applications during a single contactless session.

Figure 6:
FIG. 6 is an exemplary schematic flowchart illustration of a method according to embodiments of the present invention demonstrating the process of performing multiple contactless transactions of different applications during a single contactless session without using the mixed mode operation.

Reference is made to FIG. 6, which is an exemplary schematic flowchart illustration of a method 600 which demonstrates the process of performing multiple contactless transactions of different applications during a single contactless session without using the mixed mode operation according to embodiments of the invention. This process may be similar to that described with reference to FIG. 5, only the user selection may be read using pins which may be active in contactless only mode so as to eliminate the need for mixed mode operation. The user selection may be read using dedicated pins or using some of the contact mode pins or a combination thereof. According to some demonstrative embodiments of the invention, the user may first present the contactless smart card into close proximity with the contactless reader 610, for example, as defined in ISO/WEC 14443. Upon receiving signals at the antenna, $V_{DD}$ may be extracted 620. The user may then select the desired application using a selection mechanism associated with the smart card 630. The user selection may be read 640, the respective application may be selected 650, and while the application is running, a contactless transaction according to the selected application may take place 660. While executing the selected application, and as long as the card is kept in proximity with the contactless reader 670, the user selection may be monitored continuously or at convenient time intervals 690. In case the user changes his selection 695, the respective new application may be selected 650, and a contactless transaction according to the new selected application may take place 660. Upon completion of the session, the card may be removed from the reader and go to Power Off state 680.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A contactless multi-application smart card comprising:
a processor having stored thereon a plurality of applications, wherein said processor is able to operate in a contact mode, in a contactless mode and in a mixed contact-contactless mode;
a selection mechanism to enable a user to select a state among of a plurality of states, each one of said states corresponding to a respective application among said plurality of applications; and
circuitry to:
enable said processor to sample the state of said selection mechanism, wherein said circuitry is to sample the state of the selection mechanism if a radio frequency (RF) signal from a contactless reader is present, by:
extracting contact supply voltage from said RF signal, maintaining a contact mode power up sequence, and engaging said processor in said mixed contact-contactless mode operation so as to enable said processor to sample a state of said selection mechanism;
wherein said processor is to run said selected application based upon the sampled state of the selection mechanism.

2. The smart card of claim 1, wherein said selection mechanism comprises a switch having a plurality of states.

3. The smart card of claim 2, wherein said circuitry is to produce a respective voltage level for each state of said switch, and to translate said voltage level to a digital signal at an input to said processor, and wherein said processor is to determine said respective application among said plurality of applications, based on said respective digital signal at said input.

4. The smart card of claim 2, wherein said switch has two terminals, the first terminal of said switch being connected to a ground pin of said smart card and the second terminal of said switch being connected to an input/output pin of said circuitry.

5. The smart card of claim 2, wherein said circuitry is to produce a respective combination of digital signals for each state of said switch at multiple inputs to said processor, and wherein said processor is to determine said respective application, selected from said plurality of applications, based on said respective combination of digital signals at said multiple inputs.

6. The smart card of claim 2 wherein said processor is to operate in any of a contact mode, a contactless mode, or a mixed contact-contactless mode, and wherein upon the presence of a radio frequency (RF) signal from a contactless reader, said circuitry is further to engage said processor in said mixed contact-contactless mode operation so as to enable said processor to determine based thereupon the state of said switch.

7. A method of operating a contactless multi-application smart card containing a processor having stored thereon a plurality of applications, wherein said processor is able to operate in a contact mode, in a contactless mode and in a mixed contact-contactless mode, said method comprising:
providing a selection mechanism having a plurality of states, each of said states corresponding to respective application;

upon presence of a radio frequency (RF) signal from a contactless reader proximate to said card:
extracting contact supply voltage from said RF signal, maintaining contact mode power up sequence, and engaging said processor in a mixed contact-contactless mode operation;
determining the state of said selection mechanism by said processor; and
initiating by said processor said corresponding application based on said determined state.

8. The method of claim 7, wherein providing said selection mechanism comprises providing a switch having a plurality of states.

9. The method of claim 8, wherein determining the state of said selection mechanism comprises:

producing a respective voltage level based on the state of said switch;
translating said voltage level to a digital signal at an input to said processor; and
determining by said processor said respective application, out of said plurality of applications, based on said respective digital signal at said input.

10. The method of claim 8, wherein said switch has two terminals, the first terminal of said switch is connected to ground pin of said smart card and the second terminal of said switch is connected to an input/output pin of said circuitry.

11. The method of claim 7, wherein said processor is able to operate in a contact mode, in a contactless mode and in a mixed contact-contactless mode.

* * * * *